United States Patent
Vaz De Azevedo

(10) Patent No.: US 7,832,423 B2
(45) Date of Patent: Nov. 16, 2010

(54) VALVE HAVING A BODY INCORPORATING A FILTER

(75) Inventor: José Vaz De Azevedo, Saint Vincent (FR)

(73) Assignee: Valeo Systemes de Controle Moteur, Osny (FR)

( * ) Notice: Subject to any disclaimer, the term of this patent is extended or adjusted under 35 U.S.C. 154(b) by 0 days.

(21) Appl. No.: 11/667,342

(22) PCT Filed: Nov. 7, 2005

(86) PCT No.: PCT/FR2005/002768

§ 371 (c)(1),
(2), (4) Date: May 8, 2007

(87) PCT Pub. No.: WO2006/051205

PCT Pub. Date: May 18, 2006

(65) Prior Publication Data

US 2008/0041463 A1  Feb. 21, 2008

(30) Foreign Application Priority Data

Nov. 9, 2004  (FR) .................................. 04 11909

(51) Int. Cl.
*B01D 35/02* (2006.01)
(52) U.S. Cl. .................... 137/549; 137/544; 210/430
(58) Field of Classification Search ............... 137/544, 137/549, 550; 210/348, 359, 420, 429, 430
See application file for complete search history.

(56) References Cited

U.S. PATENT DOCUMENTS

| 1,633,320 | A |   | 6/1927 | Franchetti |
| 3,004,670 | A | * | 10/1961 | Zonker ....................... 210/429 |
| 4,582,085 | A | * | 4/1986 | Hafner et al. ................ 137/544 |
| 4,951,878 | A | * | 8/1990 | Casey et al. ................. 137/549 |
| 5,402,817 | A | * | 4/1995 | Bueser ........................ 137/549 |
| 5,409,036 | A | * | 4/1995 | Ahmadian et al. ........... 137/549 |
| 5,809,977 | A | * | 9/1998 | Krimmer et al. ............ 137/550 |
| 6,253,789 | B1 | * | 7/2001 | Krimmer et al. ............ 137/550 |
| 2003/0085168 | A1 |  | 5/2003 | Kyllonen |
| 2003/0172974 | A1 |  | 9/2003 | Krimmer et al. |

FOREIGN PATENT DOCUMENTS

GB  754528  8/1956

OTHER PUBLICATIONS

International Search Report for PCT/FR2005/002768 mailed Feb. 6, 2006 with English translation (4 pages).

* cited by examiner

*Primary Examiner*—John Rivell
(74) *Attorney, Agent, or Firm*—Osha • Liang LLP

(57) ABSTRACT

A valve having a body incorporating a filter The disclosure relates to a valve comprising a body defining a duct, a filter member defining filter passages and extending inside the duct, and a valve member mounted to move in the body between a closed position in which it closes the duct, and an open position in which it leaves the duct disengaged, the filter member comprising two filter portions having complementary profiles and secured respectively to the body and to a support element fastened inside the body in such a manner that the filter passages are defined between the facing portions of the complementary profiles.

5 Claims, 2 Drawing Sheets

VALVE HAVING A BODY INCORPORATING A FILTER

The present invention relates to a valve suitable for use in particular for controlling the flow rate of a fluid flowing in a fluid transport circuit. By way of example, the valve can be used in a circuit feeding an engine with fuel.

BACKGROUND OF THE INVENTION

A valve generally comprises a body defining a duct, and a valve member mounted to move inside the body between a closed position in which it closes the duct and an open position in which it leaves the duct disengaged. An actuator member, e.g. an electromagnetic actuator member, is mounted on the body to move the valve member between said closed and open positions. A filter member is also provided, extending inside the duct to prevent particles from clogging and blocking the valve or from damaging equipment situated downstream from the valve. By way of example, such particles may come from particles of active carbon used in a device for recycling fuel vapor ("a canister") located upstream from the valve, or they may come from metal shavings that result from a component of the circuit upstream from the valve being subjected to wear.

Valves are known in which the body incorporates a filter member provided directly from molding the body. That filter member generally comprises teeth that are spaced apart and that have facing portions defining filter passages. The minimum width of the filter passages is defined by the minimum width of the mold in this location. As a result, such a valve cannot be adapted to circuits in which there is a risk of finding particles of dimensions smaller than the above-defined minimum width.

OBJECT OF THE INVENTION

It would therefore be advantageous to have a valve incorporating inexpensive filter means that are not constrained by the above-mentioned limitation.

BRIEF SUMMARY OF THE INVENTION

To this end, the invention provides a valve comprising a body defining a duct, a filter member defining filter passages and extending inside the duct, and a valve member mounted to move in the body between a closed position in which it closes the duct, and an open position in which it leaves the duct disengaged, the filter member comprising two filter portions having complementary profiles and secured respectively to the body and to a support element fastened inside the body in such a manner that the filter passages are defined between the facing portions of the complementary profiles.

Thus, the dimensions of the filter passages result from the relative positioning of the two filter portions. There is therefore no bottom limit on these dimensions, other than limits associated with manufacturing and assembly tolerances. It is therefore possible to have filter passages of very small dimensions. In addition, the filter member has a structure that is relatively simple.

Other characteristics and advantages of the invention appear on reading the following description of a particular, non-limiting embodiment of the invention.

BRIEF DESCRIPTION OF THE DRAWINGS

Reference is made to the accompanying drawings, in which.

DETAILED DESCRIPTION OF THE INVENTION

Figure 1:
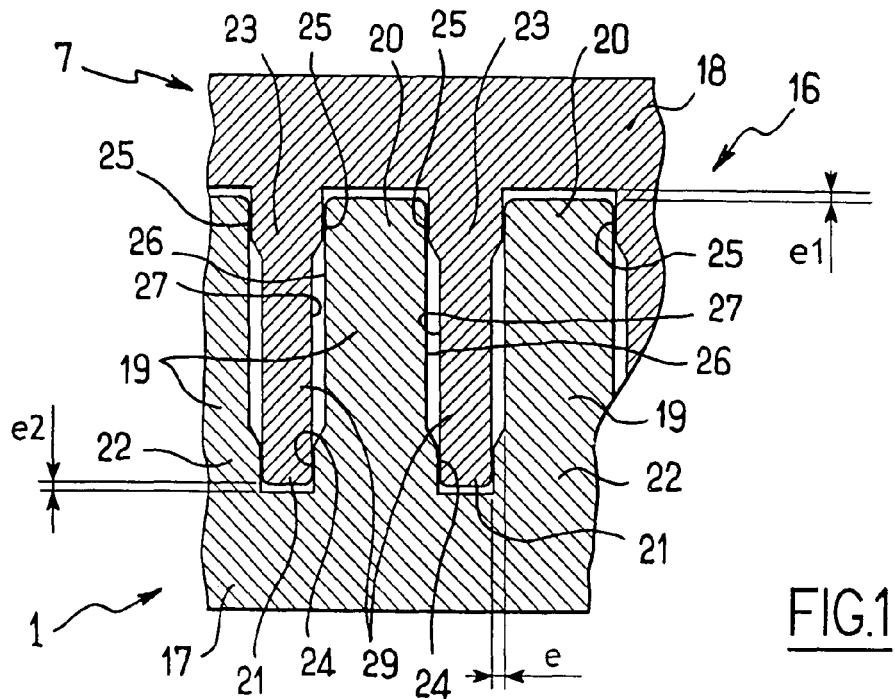
FIG. 1 is a fragmentary section view of two filter portions showing the principle of the invention.
Figure 2:
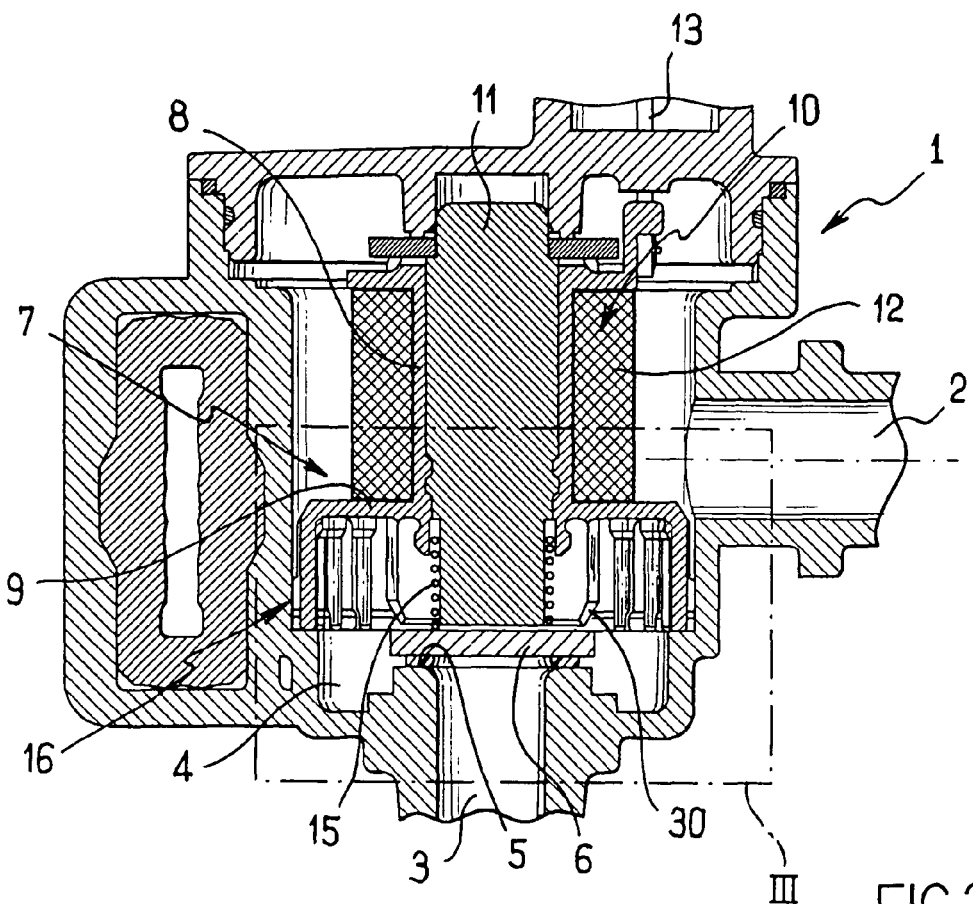
FIG. 2 is a fragmentary section view of a valve in accordance with the invention.
Figure 3:
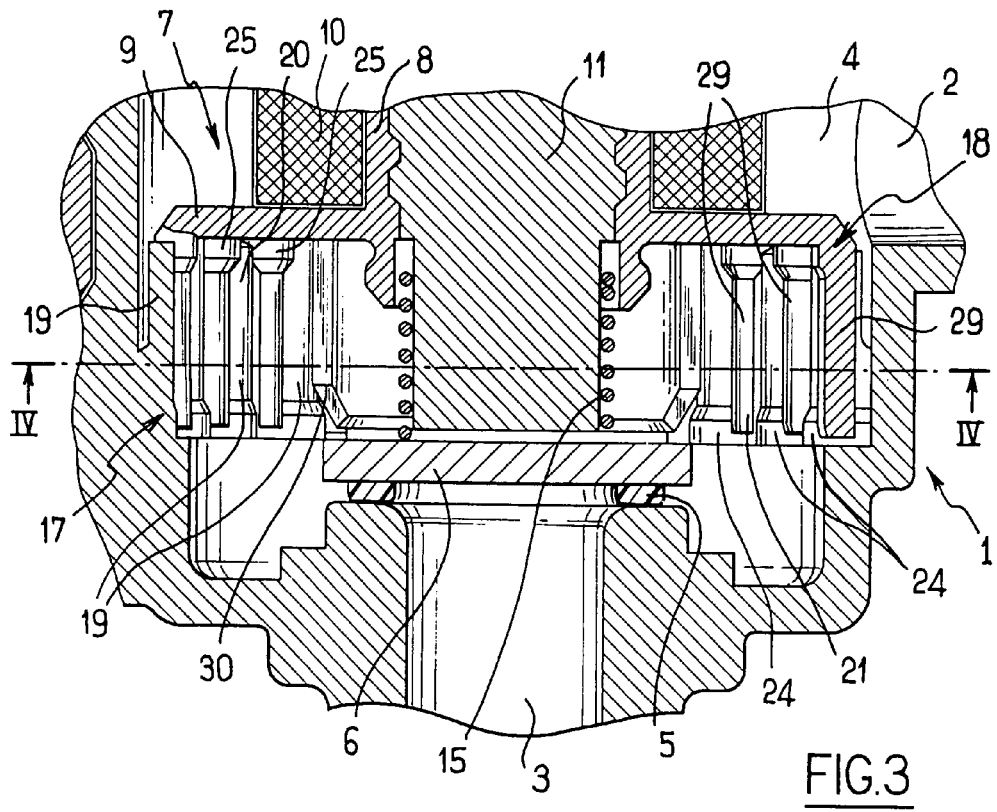
FIG. 3 is a detail view of the zone III of FIG. 2.
Figure 4:
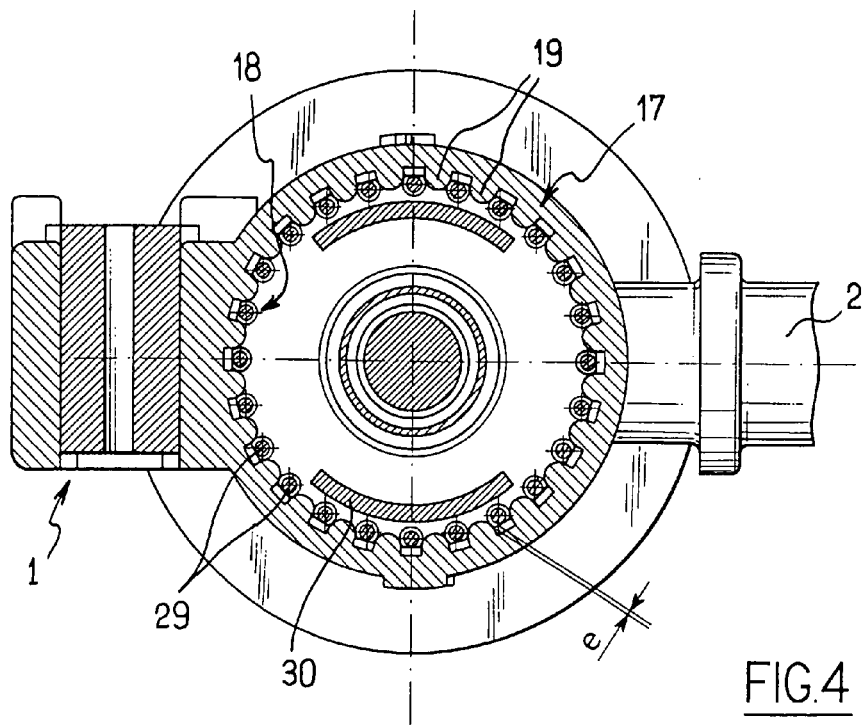
FIG. 4 is a section view on line IV-IV of FIG. 3.

With reference to the figures, the valve in accordance with the invention comprises a body given overall reference 1 defining an inlet duct 2 and an outlet duct 3, both having an end opening out into a housing 4. Said end of the outlet duct 3 defines a seat 5 for a conventional valve member 6, made of magnetic material.

The valve member 6 is supported by a support element given overall reference 7 that is fastened inside the housing 4, facing the seat 5 on the axis of the outlet duct 3.

The support element 7 comprises a tubular portion 8 having one end terminated by a collar 9 that extends beside the outlet duct 3.

The support element 7 is associated with an electromagnetic actuator member 10 for actuating the valve member 6. The electromagnetic actuator member 10 is conventional and comprises a core 11 received in the tubular portion 8, and a coil 12 that extends in conventional manner around the tubular portion 8 and that is connected to an electrical connector 13 enabling the coil 12 to be connected to an electrical power supply (not shown). The actuator member 10 also comprises a flux-looping bell 30. The core 11 has an end projecting from the collar 9. In this example, the core 11 is embedded in the support element 7, and the coil 12 is made by winding a conductor directly onto the support element 7.

The valve member 6 is guided in the housing 4 in conventional manner to slide between a closed position in which the valve member 6 bears against the seat 5, and an open position in which the valve member 6 is spaced apart from the seat 5. A helical spring 15 extends around of the projecting end of the core 11, between the collar 9 and the valve member 6, to force the valve member 6 to press against the seat 5.

In conventional manner, it will be understood that when the coil 12 is excited, it generates magnetic flux in the core 11 that attracts the valve member 6 against the projecting end of the core 11, overcoming the force exerted by the helical spring 15. The valve member 6 is then in the open position.

The valve in accordance with the invention incorporates a filter member given overall reference 16. The filter member comprises two filter portions 17, 18 of complementary profiles that are secured respectively to the body 1 and to the support element 7, in such a manner that filter passages are defined between the facing portions of the complementary profiles of the filter portions.

The filter portion 17 includes sprockets 19 that extend into the housing 4 parallel to the sliding direction of the valve member 6. These sprockets 19 are made integrally with the body 1.

The filter portion 18 includes sprockets 29 that extend from the periphery of the collar 9 in a direction parallel to the sliding direction of the valve member 6.

Each of the sprockets 19, 29 has a respective free end 20, 21 and an end 22, 23 that is secured respectively to the body 1 or to the collar 9. The ends 22, 23 are provided with respective centering portions 24, 25. The sprockets 19, 29 extend along two circles concentric about the axis of the valve member 6 and in the vicinity thereof, and their free ends 20, 21 are received between the centering portions 24, of the adjacent teeth. This prevents the sprockets being poorly centered relative to one another to such an extent that a filter passage of width greater than that intended appears on one of the sides of the sprockets. Filter passages of thickness e are thus defined between the side surfaces 26, 27 of the sprockets 19, 29.

In addition, the sprockets 19 have their free ends 20 extending at a distance from the collar 9, while the sprockets 29 have their free ends 21 extending at a distance from the body 1. This defines filter passages having respective thicknesses of e1 and e2. This arrangement provides a maximum number of filter passages so as to avoid restraining the flow of fluid relative to the maximum flow rate permitted by the valve member 6 in the open position.

Thus, the fluid coming from the inlet duct 2, passes via the filter passages before reaching the outlet duct 3. This makes it possible to limit any risk of particles disturbing the movement of the valve member 6 or of disturbing the operation of equipment disposed downstream from the valve.

Naturally, the invention is not limited to the embodiment described, and variant embodiments can be applied thereto without going beyond the ambit of the invention as defined by the claims.

In particular, the filter member may be arranged in the inlet duct 2 or in the outlet duct 3, and the support element may serve solely to constitute one of the filter portions.

The filter portions may also have complementary profiles of shapes different from those described. Thus, the complementary profiles may be crenellated in shape or sawtooth shaped. The filter passages may also be arranged solely at the ends of the teeth or between their side surfaces.

Furthermore, the structure of the valve may be different from that described. The actuator member may be a mechanical actuator member positioned outside the housing 4. The support element may then also be in the form of a cup having its periphery arranged to constitute a complementary profile for forming one of the filter portions.

The sprockets and/or teeth may also extend radially.

The sprockets and/or teeth may have central centering portions, or centering portions at both ends. The sprockets and/or teeth need not have any particular centering portions if the sprockets and/or teeth are short.

What is claimed is:

1. A valve comprising:
    a body defining a duct,
    a filter member defining filter passages and extending inside the duct, and
    a valve member mounted to move in the body between a closed position in which it closes the duct, and an open position in which it leaves the duct disengaged, wherein the valve member is connected to an electromagnetical actuator member mounted in the body and comprising a coil and a core,
        wherein the filter member comprises two filter portions having complementary profiles and secured respectively to the body and to a support element fastened inside the body in such a manner that the filter passages are defined between the facing portions of the complementary profiles, and wherein the complementary profiles include sprockets engaged mutually between one another, and
        wherein the support element comprises a tubular portion, wherein the core extends into the tubular portion and the coil extends around the tubular portion.

2. A valve according to claim 1, wherein the sprockets are disposed in concentric circles around the valve member.

3. A valve according to claim 1, wherein the sprockets are parallel to a sliding direction of the valve member between the closed and open positions.

4. A valve according to claim 1, wherein each sprocket of at least one portion of the filter includes at least one portion for centering the sprocket relative to two adjacent sprockets of the other filter portion.

5. A valve according to claim 1, wherein the support element comprises, in the vicinity of the valve member, a collar having a periphery from which there extends the complementary profile of the corresponding filter portion.

* * * * *